US008583674B2

(12) United States Patent
Zheleva et al.

(10) Patent No.: US 8,583,674 B2
(45) Date of Patent: Nov. 12, 2013

(54) MEDIA ITEM RECOMMENDATION (75) Inventors: Elena Zheleva, College Park, MD (US); John Guiver, Saffron Walden (GB); Natasa Milic-Frayling, Cambridge (GB); Eduarda Mendes Rodrigues, Vila Nova de Gaia (PT)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 12/818,425

(22) Filed: Jun. 18, 2010

(65) Prior Publication Data

US 2011/0314039 A1  Dec. 22, 2011

(51) Int. Cl.
*G06F 7/00* (2006.01)
*G06F 17/30* (2006.01)

(52) U.S. Cl.
USPC .......................................... 707/767; 705/26.7

(58) Field of Classification Search
None
See application file for complete search history.

(56) References Cited

U.S. PATENT DOCUMENTS

| 6,748,395 | B1 | 6/2004 | Picker et al. | |
|---|---|---|---|---|
| 7,521,620 | B2 | 4/2009 | Samadani et al. | |
| 7,620,467 | B2 | 11/2009 | Lee et al. | |
| 7,627,605 | B1 | 12/2009 | Lamere et al. | |
| 7,678,984 | B1 | 3/2010 | Lamere | |
| 7,680,824 | B2 | 3/2010 | Plastina et al. | |
| 7,685,210 | B2 | 3/2010 | Plastina et al. | |
| 7,689,705 | B1 | 3/2010 | Lester et al. | |
| 7,987,148 | B2 * | 7/2011 | Hangartner et al. | 706/46 |
| 2002/0082901 | A1 | 6/2002 | Dunning et al. | |
| 2002/0107853 | A1 * | 8/2002 | Hofmann et al. | 707/7 |
| 2002/0188507 | A1 * | 12/2002 | Busche | 705/14 |
| 2004/0034652 | A1 * | 2/2004 | Hofmann et al. | 707/102 |
| 2004/0059626 | A1 * | 3/2004 | Smallwood | 705/10 |
| 2004/0172267 | A1 * | 9/2004 | Patel et al. | 705/1 |
| 2005/0038819 | A1 | 2/2005 | Hicken et al. | |
| 2005/0060242 | A1 * | 3/2005 | Armstrong et al. | 705/28 |
| 2005/0071251 | A1 * | 3/2005 | Linden et al. | 705/26 |
| 2006/0020924 | A1 * | 1/2006 | Lo et al. | 717/127 |
| 2006/0136589 | A1 * | 6/2006 | Konig et al. | 709/224 |
| 2006/0143028 | A1 * | 6/2006 | Altmann et al. | 705/1 |
| 2006/0224554 | A1 * | 10/2006 | Bailey et al. | 707/1 |
| 2006/0259344 | A1 * | 11/2006 | Patel et al. | 705/9 |

(Continued)

OTHER PUBLICATIONS

Modeling User Behaviour for Web Recommendation Using LDA Model, Xu et al, IEEE/WIC/ACM International Conference on Web Intelligence and Intelligent Agent Technology, 2008.*
A probabilistic Model for Music Recommendation Considering Audio Features, Li et al, AIRS 2005, LNCS 3689, 72-83, 2005.*

(Continued)

*Primary Examiner* — Augustine K Obisesan
(74) *Attorney, Agent, or Firm* — Zete Law, P.L.L.C.; MacLane C. Key (57) ABSTRACT

Recommending a media item may include, for example, a statistical model of media consumption is applied to media session consumption data from a community of users to infer parameters of the model. The model comprises a first probability distribution for each user defining a likelihood of the user having a latent characteristic for a session, and a second probability distribution for each latent characteristic defining a likelihood of a user selecting a media item given the latent characteristic. In another example, the inferred parameters are provided to a recommendation engine arranged to recommend media items. The recommendation engine uses the model with inferred parameters and data describing media items newly consumed by a user to infer a current latent characteristic for a current session of the user, and uses them to generate recommended media items for the user in the current session based on the current latent characteristic.

19 Claims, 9 Drawing Sheets

(56) References Cited

U.S. PATENT DOCUMENTS

| | | | |
|---|---|---|---|
| 2007/0061363 A1* | 3/2007 | Ramer et al. | 707/104.1 |
| 2007/0118546 A1* | 5/2007 | Acharya | 707/101 |
| 2008/0189232 A1* | 8/2008 | Dunning et al. | 706/45 |
| 2008/0294617 A1* | 11/2008 | Chakrabarti et al. | 707/5 |
| 2009/0006290 A1* | 1/2009 | Gunawardana et al. | 706/14 |
| 2009/0019091 A1* | 1/2009 | Horvitz et al. | 707/201 |
| 2009/0300008 A1* | 12/2009 | Hangartner et al. | 707/5 |
| 2010/0030764 A1* | 2/2010 | Koren | 707/5 |
| 2010/0030768 A1* | 2/2010 | Poblete et al. | 707/5 |
| 2010/0100416 A1* | 4/2010 | Herbrich et al. | 705/10 |
| 2010/0169343 A1* | 7/2010 | Kenedy et al. | 707/758 |
| 2010/0185671 A1* | 7/2010 | Burba et al. | 707/780 |
| 2010/0235313 A1* | 9/2010 | Rea et al. | 706/52 |
| 2010/0318544 A1* | 12/2010 | Nicolov | 707/759 |
| 2011/0035379 A1* | 2/2011 | Chen et al. | 707/740 |
| 2011/0145051 A1* | 6/2011 | Paradise et al. | 705/14.25 |

OTHER PUBLICATIONS

Content-Based, Collaborative Recommendation, Balabanovic et al, Communication of the ACM, 1997.*
Qualitative Analysis of User-Based and Item-Based Prediction Algorithms for Recommendation Agents, Papagelis et al, LNAI 3191, 152-166, 2004.*
A Web Recommendation Technique Based on Probabilistic Latent Semantic Analysis, Xu et al,WISE 2005, LNCS 3806, 15-28, 2005.*
Efficient Bayesian Hierarchical User Modeling for Recommendation Systems, Zhang et al, SIGIR Proceedings, 2007.*
Supporting Context-Aware Media Recommendations for Smart Phones, Yu et al, Pervasive Computing, 2006.*
Web Personalization as a Persuation Strategy: An Elaboration Likelihood Model Perspective, Tam et al., Information System Research, 16(3), 271-291, 2005.*
A Stereotypes-Based Hybrid Recommender System for Media Items, Shani et al, Association for the Advancement of Artificial Intelligence, 2007.*
Collaborative Filtering via Gaussian Probabilistic Latent Semantic Analysis, Hofman et al, SIGIR, 2003.*
A Web Recommendation system Based on Maximu Entropy, Jin et al, Proceedings of the International Conference on Information Technology: Coding and Computing (ITCC'05), 2005.*
Web Usage Mining Based on Probabilistic Latent Semantic Analysis, Jin et al., KIDD'04, 2004.*
Latent Semantic Models for collaborative Filtering, Hofmann, ACM Transaction on Information Systems, 22(1), 89-115, 2004.*
Statistical Characterization of a real video on demand service: User bahaviour and streaming-media workload analysis, Garcia et al, Simulation Modeling Practice and Theory, 15, 672-689, 2007.*
Semiparametric methods for the measurement of latent attitudes and the estimation of their behavioural consquences, Spady et al. European University Institute, Florence, Centre for Microdata Methods and Practice, London, 2007.*
Media Consumption and Consumer Purchasing, Schultz et al, Worldwide Multi Media Measurement, 2006.*
Task-Oriented Web User Modeling for Recommendation, Jin et al., LNAI 3538, pp. 109-118, 2005.*
Baccigalupo, et al., "Mining Music Social Networks for Automating Social Music Services", retrieved on Apr. 12, 2010 at <<http://citeseerx.ist.psu.edu/viewdoc/download?doi=10.1.1.145.645&rep=rep1&type=pdf>>, European Conference on Machine Learning (ECML) and European Conference on Principles and Practice of Knowledge Discovery in Databases (PKDD), Notes of the Workshop on Web Mining, 2007, pp. 123-134.
Blei, et al., "Latent Dirichlet Allocation", retrieved on Apr. 12, 2010 at <<http://www.cs.princeton.edu/~blei/papers/BleiNgJordan2003.pdf>>, Journal of Machine Learning Research, vol. 3, Jan. 2003, pp. 993-1022.
Bosteels, et al., "Evaluating and Analysing Dynamic Playlist Generation Heuristics Using Radio Logs and Fuzzy Set Theory", retrieved on Apr. 12, 2010 at <<http://users.ugent.be/~klbostee/papers/ismir09.pdf>>, Proceedings of International Conference on Music Information Retrieval (ISMIR), 2009, pp. 1-6.
Deerwester, et al., "Indexing by Latent Semantic Analysis", John Wiley and Sons, Journal of the American Society for Information Science, vol. 41, No. 6, 1990, pp. 391-407.
Feng, et al., "Music Information Retrieval by Detecting Mood via Computational Media Aesthetics", IEEE Computer Society/WIC, International Conference on Web Intelligence (WI), 2003, pp. 1-7.
Henderson, et al., "Applying Latent Dirichlet Allocation to Group Discovery in Large Graph", ACM, Proceedings of Symposium on Applied Computing (SAC), Honolulu, Hawaii, Mar. 2009, pp. 1456-1461.
Hoffman, et al., "Easy as CBA: A Simple Probabilistic Model for Tagging Music", Proceedings of International Conference on Music Information Retrieval (ISMIR), Kobe, Japan, 2009, pp. 1-6.
Hofmann, "Probabilistic Latent Semantic Analysis", Uncertainity in Artificial Intelligence (UAI), Stockholm, Sweden, 1999, pp. 289-296.
Hu, et al., "Exploring Mood Metadata: Relationships With Genre, Artist and Usage", Austrian Computer SoOiety (OCG), Proceedings of International Symposium on Music Information Retrieval Systems (ISMIR), 2007, pp. 67-72.
Liu, et al., "Adaptive Music Recommendation Based on User Behavior in Time Slot", retrieved on Apr. 12, 2010 at <<http://paper.ijcsns.org/07_book/200902/20090229.pdf>>, International Journal of Computer Science and Network Security (IJCSNS), vol. 9, No. 2, Feb. 2009, pp. 219-227.
Liu, et al., "Automatic Mood Detection from Acoustic Music Data", Johns Hopkins University, Proceedings of the International Symposium on Music Information Retrieval (ISMIR), 2003, pp. 81-87.
Mallows, "A Note on Asymptotic Joint Normality", The Annals of Mathematical Statistics, vol. 43, No. 2, 1972, pp. 508-515.
Marlin, et al., "Collaborative Prediction and Ranking with Non-Random Missing Data", ACM, Proceedings of Conference on Recommender Systems (RecSys), New York, New York, Oct. 2009, pp. 5-12.
Marlin, "Modeling User Rating Profiles for Collaborative Filtering", MIT Press, Proceedings of Advances in Neural Information Processing Systems (NIPS), 2003, pp. 1-8.
McCallum, et al., "Joint Group and Topic Discovery from Relations and Text", Springer Berlin, Lecture Notes in Computer Science, Statistical Network Analysis: Models, Issues and New Directions, vol. 4503, 2007, pp. 28-44.
McCallum, et al., "Topic and Role Discovery in Social Networks with Experiments on Enron and Academic Email", AI Access Foundation, Journal of Artificial Intelligence Research, vol. 30, No. 1, 2007, pp. 249-272.
Minka, "Divergence measures and message passing", Microsoft Corporation, Microsoft Research, 2005, pp. 1-17.
Minka, et al., "Gates", Advances in Neural Information Processing Systems (NIPS), vol. 21, 2008, pp. 1-8.
Minka, "Infer.NET 2.3", retrieved on Jul. 30, 2010 at <<http://research.microsoft.com/infernet>>, Microsoft Corporation, Microsoft Research Cambridge, 2009, pp. 1-2.
Pampalk, et al., "Dynamic Playlist Generation Based on Skipping Behavior", retrieved on Apr. 12, 2010 at <<http://www.ofai.at/cgi-bin/get-tr?paper=oefai-tr-2005-23.pdf>>, Queen Mary, University of London, Proceedings of Symposium on Music Information Retrieval (ISMIR), 2005, pp. 634-637.
Platt, et al., "Learning a Gaussian Process Prior for Automatically Generating Music Playlists", retrieved on Apr. 12, 2010 at <<http://books.nips.cc/papers/files/nips14/AP03>>, Advances in Neural Information Processing Systems, vol. 14, 2002, pp. 1425-1432.
Platt, et al., "Learning a Gaussian Process Prior for Automatically Generating Music Playlists", In Dietterich et al., Dec. 2001, pp. 1425-1432.
Ragno, et al., "Inferring Similarity Between Music Objects with Application to Playlist Generation", retrieved on Apr. 12, 2010 at <<http://research.microsoft.com/en-us/um/people/cburges/papers/acm_sigmm_mir_05.pdf>>, ACM, Workshop on Multimedia Information Retrieval (MIR), Singapore, Nov. 2005, pp. 1-8.

(56) References Cited

OTHER PUBLICATIONS

Stern, et al., "Matchbox: Large Scale Online Bayesian Recommendation", ACM, Proceedings of International World Wide Web Conference (WWW), Madrid, Spain, Apr. 2009, pp. 111-120.

Winn, et al., "Variational Message Passing", Publisher: JMLR.org, Journal of Machine Learning Research, vol. 5, 2005, pp. 661-694.

Zhang, et al., "An LDA-based Community Structure Discovery Approach for Large-Scale Social Networks", IEEE Intelligence and Security Informatics (ISI), 2007, pp. 200-207.

Zheleva, et al., "Statistical Models of Music-listening Sessions in Social Media", retrieved on Apr. 12, 2010 at <<http://linqs.cs.umd.edu/basilic/web/Publications/2010/zheleva:www10/wfp0858-zheleva.pdf>>, ACM, Proceedings of International World Wide Web Conference (WWW), Raleigh, North Carolina, Apr. 2010, pp. 1019-1028.

Zhou, et al., "A New Mallows Distance Based Metric for Comparing Clusterings", ACM, Proceedings of Conference on Machine Learning (ICML), Bonn, Germany, vol. 119, 2005, pp. 1028-1035.

* cited by examiner

MEDIA ITEM RECOMMENDATION

BACKGROUND

Online social networks are becoming increasingly popular as a way for users to consume media over networks such as the internet. For example, many users are using social network communities as a portal to discover and listen to music, or find films to watch or news stories to read. As these online social networks become more centered around media content and proliferate, there is an increased interest in analyzing interactions among users and characterizing their behavior in terms of the individuals' and community preference for specific types of media content.

Many of these social networks include features that encourage social interactions by providing personalized recommendations to influence the media selection of users. Furthermore, they offer community-based recommendations and interfaces for browsing and searching for available media content. User experience in these social media settings involves complex, rich interactions with the media content and other participants in the community. In order to support such communities, it is useful to understand the factors that drive the users' engagement.

Providing effective personalized recommendations for relevant media content to a user in the context of a wider community is therefore a complex task. Existing services provide a static taxonomy of media types or genre. Such taxonomies serve as the means for users to express their interests and find adequate media. They provide media categories that are commonly adopted by the user community and, thus, can be used to characterize a user's media consumption behavior to some degree.

For example, in the case of a music service, a user can express an interest in songs of a certain genre. The music service can use this information by assuming that whilst the user may not necessarily want to repeat the same song, the person is likely to choose the next song to play from the same or a related genre. This can be used to drive personalized recommendations. However, even basic genre taxonomies may have a large number of categories and lead to sparse and ineffective representations of media consumption patterns.

Such genre-based recommendations do not capture the many complex factors underlying the consumption of media by a user. For example, in a song listening context, the user can select the next song as a result of the user's music listening habits, the layout of the user interface, the specific state of mind of the user, a recommendation from a friend, or many other factors or influences. However, computationally, it is not feasible to include all the variables to model the user behavior and the context characteristics for making predictions that closely match real time media consumption.

The embodiments described below are not limited to implementations which solve any or all of the disadvantages of known media recommendation techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Media item recommendation is described. In one example, a statistical model of media consumption is applied to media session consumption data from a community of users to infer parameters of the model. The model comprises a first probability distribution for each user defining a likelihood of a user having a latent characteristic for a session, and a second probability distribution for each latent characteristic defining a likelihood of the user selecting a media item given the latent characteristic. In another example, the inferred parameters are provided to a recommendation engine arranged to recommend media items. The recommendation engine uses the model with inferred parameters and data describing media items newly consumed by a user to infer a current latent characteristic for a current session of the user, and uses them to generate recommended media items for the user in the current session based on the current latent characteristic.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an online social media system, the system described is provided as an example and not a limitation. As those skilled in the art will appreciate, the present examples are suitable for application in a variety of different types of media consumption environments.

Described herein is a media recommendation technique that utilizes both individual information about a user's media consumption and information from a wider media consumption community. A statistical model is developed that captures latent, underlying characteristics across media consumption sessions of the users in the community. In this approach, latent characteristics for the users over media consumption sessions are derived, rather than a-priori specifying certain properties of the media. For example, in a music listening example, the latent characteristic can describe the users' affinity to listen to specific groups of songs, and can hence be described as a listening "mood". Such latent characteristics underlie the media selections of the user, but are not directly measurable.

The latent characteristics are derived as clusters (e.g. soft clusters) of media items from the larger media selection that emerge from the media consumption sessions across the community. A session is a sequence of media items. The boundary between sessions can be determined using different criteria. For example, the session may comprise media items consumed with less than a threshold of idle time between consecutive items. In other words, sessions are separated by pauses between two consecutive media items longer than a predefined threshold. Alternatively, the threshold may not be predefined but automatically calculated from the characteristics of the user consumption, e.g., comparing the time elapsed since the latest media item relative to the average idle time between items up to that point. In a further alternative, sessions can be of a pre-specified fixed time interval rather than based on a monitoring of the consumption patterns.

Media items in this context can refer to music (songs), books, photographs, videos, films, news stories, blog and microblog postings (such as Twitter™), social networking updates, or any other type of media that is consumed in sessions by users. Such items are discernable from each other and come in a sequence. The media items comprise digital media content that can be electronically delivered over a communication network.

Figure 1:
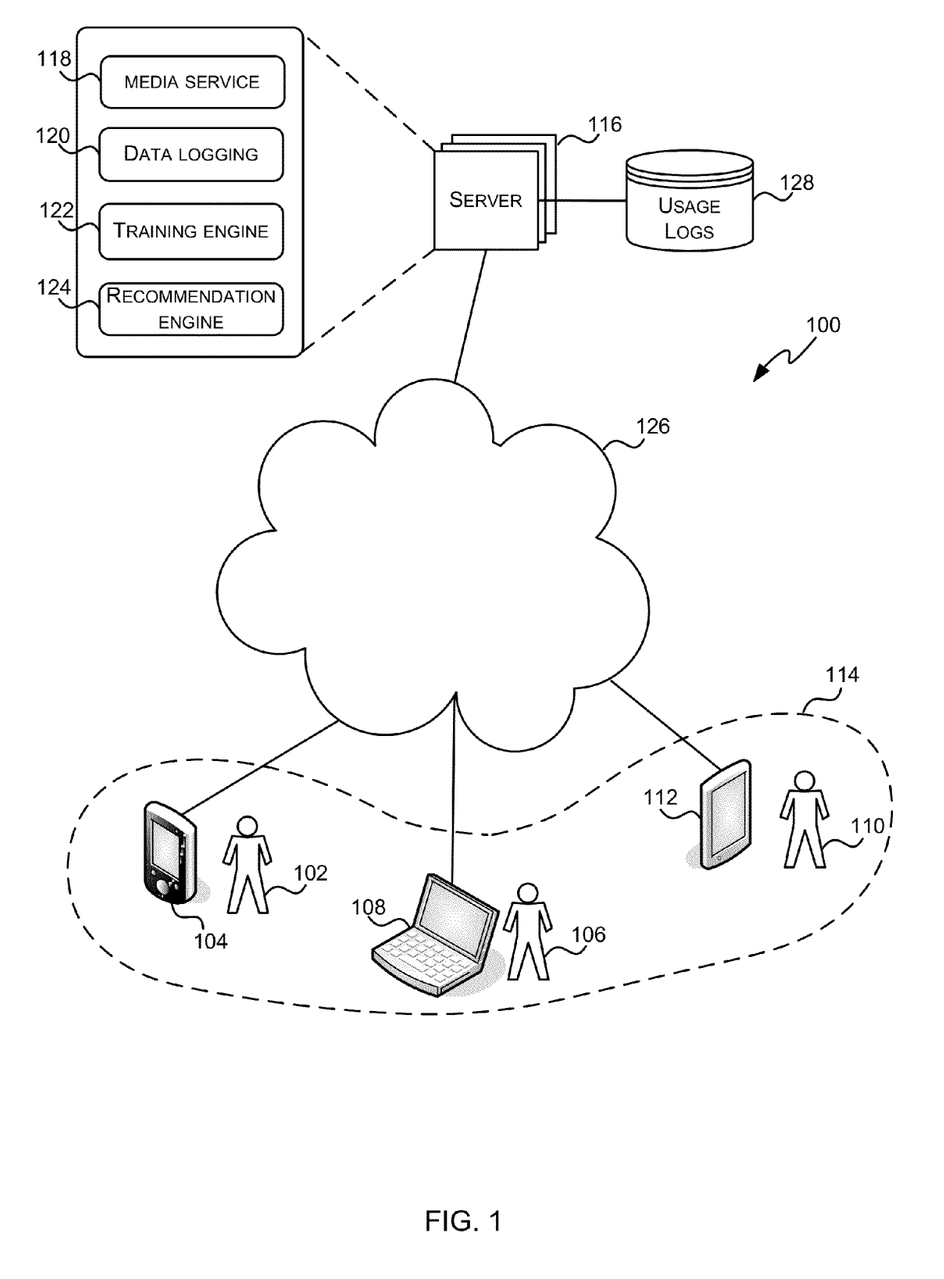
FIG. 1 illustrates an online social media environment providing media recommendations.

Reference is first made to FIG. 1, which illustrates an online social media environment 100 providing media recommendations. The online social media environment 100 comprises a first user 102 operating a first user terminal 104. The first user 102 can use the first user terminal 104 to access media content from the social media environment, and may also participate in online social networking activities. The user terminal can be a portable media player, smart phone, personal computer, games console, or any other end-user device enabling the consumption of media.

Note that in some examples a user may have multiple devices (not shown in FIG. 1) and log into some or all of them at once, consuming media. For example, a user with multiple devices may run independent sessions on each device—e.g., consumes digital radio on a laptop in the living room and another session his/her mobile phone while sitting in the dining room. In another example, the user may move from one device to another, e.g., starts on a PC and then continues on a mobile. Therefore, when interacting with a media service, a user can be identified by a user identifier only or by a combination of user identifier and device identifier.

Further users are also illustrated in FIG. 1, including a second user 106 operating a second user terminal 108 and a third user 110 operating a third user terminal 112. Whilst only three users are illustrated in FIG. 1, it will be understood that more users can be present in a real system. Collectively, the users in FIG. 1 can be considered to form a community 114 of users of a media service. The community 114 can be loose in the sense that the users are linked only by being common users of a certain website or media streaming service. Alternatively, the community 114 can be more cohesive, for example if the media service offers social networking-type features and each of the users actively belongs to a certain interest group or share common contacts.

At least one computing-based device 116 (e.g. a server) is arranged to provide the media service 118 to the community 114 of users. The media service can host the media items and metadata about the media items. The media service can be arranged to provision media content to the user (e.g. in the form of a music or video streaming service), deliver media content to the user for local storage (e.g. for replaying and sharing), and/or track consumption of media by the user (e.g. local playback at the user terminal or a portable media device) for use in a social networking context.

The servers can also provide functionality relating to media recommendation. This includes data logging 120, a training engine 122 and a recommendation engine 124. These are described in more detail hereinafter.

The computing-based device 116 communicates with the users of the community 114 over a communication network 126, such as the internet. For example, the computing-based device 116 can use the network 126 to deliver media content and provide a user interface to the users (e.g. in the form of a website). In communication with the computing-based device 116 is a storage device 128 arranged to store usage logs for the social media service 118. The usage logs record media consumption data for the community 114. This is outlined in more detail with reference to FIG. 2, below.

Note that the different functionality of the computing-based device 116 can be provided by a single device (e.g., server) or can be split over multiple devices (e.g., data centers, computing cloud). In addition, the functionality relating to media recommendations (i.e., the training engine and recommendation engine) can be operated by a separate entity to that operating the media service, provided access to the usage logs is enabled and permitted. The data logging 120 is a software function that is arranged to store a record of media items consumed by the users in the storage device 128 (storing the usage log), as described in more detail with reference to FIG. 2.

Figure 2:
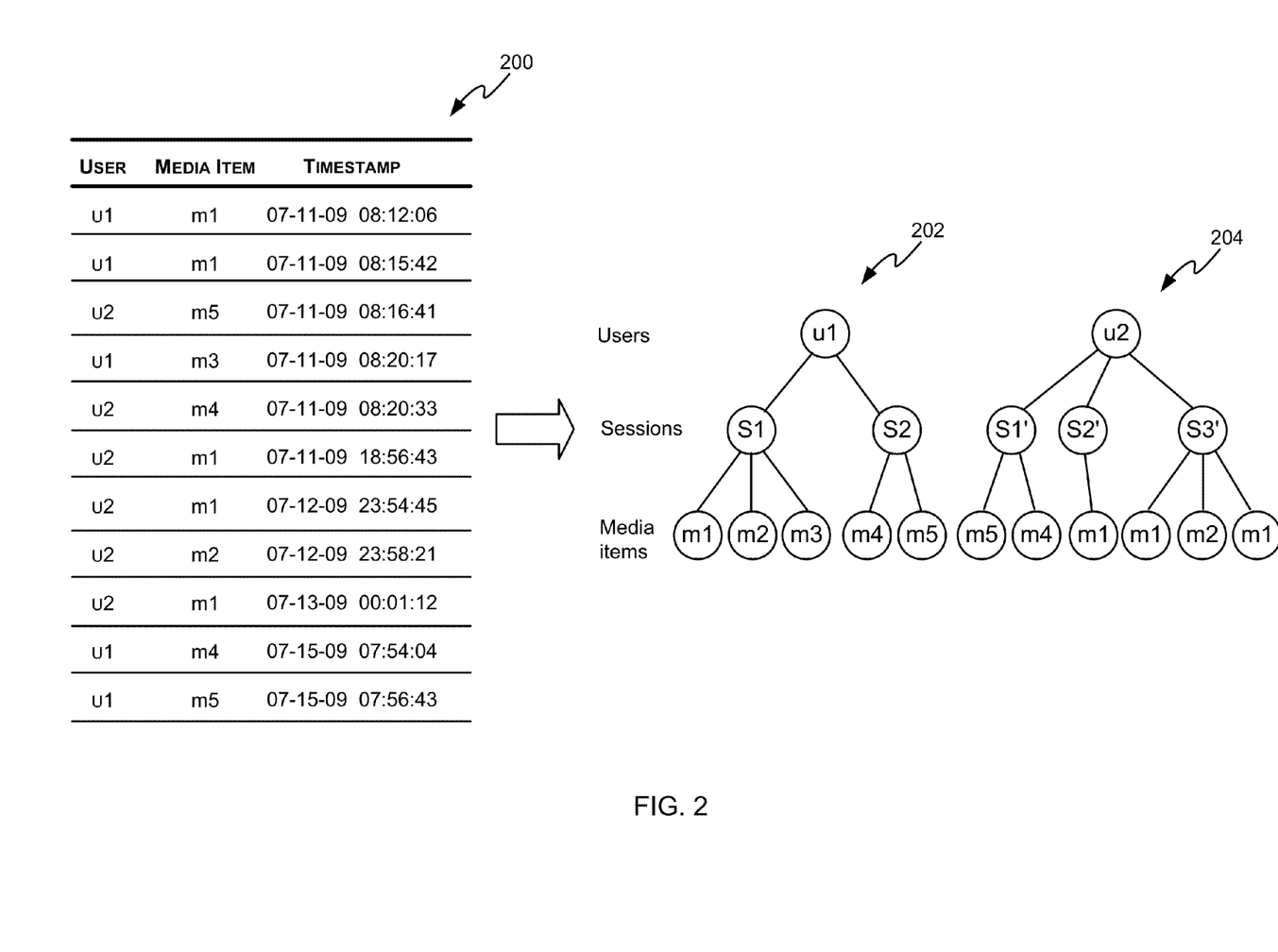
FIG. 2 illustrates media consumption log data represented as media sessions.

Reference is now made to FIG. 2, which illustrates an example media consumption usage log 200, and its conversion to media session data. When media is consumed by the community 114 using the media service, a record is made identifying the media consumed and the time at which the media is accessed. This information is recorded by the computing-based device 116 and stored in the usage log on the storage device FIG. 2 shows the example usage log 200 recording media consumption for the first user 102 (denoted u1) and the second user 106 (denoted u2). These two users have accessed five different media items (denoted m1 to m5) at different times during the period covered by the usage log 200. At each instance of media consumption, the usage log 200 records the user, the media item and a timestamp of the start of the media consumption. Note that, as mentioned above, in examples where the user has multiple devices, the device identifier can also be added to the usage log.

The usage log data can be segmented into per-user session information, as illustrated by first tree 202 for the first user (u1) and second tree 204 for the second user (u2). As mentioned above, a session is defined as a sequence of media items in which the time interval between the consumption of consecutive media items is less than a predefined threshold. In other words, when the start timestamps for two consecutive media items are within a predefined time interval, then these two media items are considered to belong to the same session.

The predefined threshold that is selected depends on the type of media content, for example in dependence on the average length of time to consume a given media item, and can be learned from usage data. In one example, in the case of music the predefined threshold can be 30 minutes between the start times of consecutive media items, although smaller or larger values can also be used as appropriate. In the case of microblog postings, the time-stamp of the posting and average frequency of postings within a time interval can be considered.

Considering the first user, u1, the media items that were consumed by this user are selected from the usage log 200. Then the time difference between the timestamps of each consecutive media item is calculated. Those that are less than the threshold are grouped together into a session, and when the time difference is greater than the threshold a new session is created. For example, it can be seen that, for u1, media items m1, m2 and m3 were consumed consecutively with only a few minutes separating each timestamp. If the predefined threshold is 30 minutes, then these are grouped into a first session, denoted S1 in the first tree 202. Between the third and fourth media item consumed by u1 was a time interval of several days. Therefore, a new session S2 is created. This session contains media items m4 and m5, as these media items were consumed within a few minutes of each other.

A similar process to that described above is also performed for the second user, u2, to create the second tree 204. The second tree 204 comprises three sessions, denoted S1', S2' and S3'. Therefore, using this segmentation process, a tree structure is created that separates the media consumption for each user into media consumption sessions. The example sessions in FIG. 2 show some patterns. For example, session S2 of the first user u1 is similar to session S1' of the second user u2, and session S1 of the first user u1 is similar to session S3' of the second user u2. The techniques described herein identify and characterize such patterns.

The example of FIG. 2 also illustrates how media items can be present in more than one session (e.g. m4 in S2 and S1'), how media items can occur more than once within a session (e.g. m1 twice in S3'), and how a session can comprise only a single media item (e.g. only m1 in S2').

Note that, in other examples, the segmentation of sessions can be calculated in different ways, depending on the usage log data that is available. For example, the usage log 200 can record further information, such as a timestamp of the end of the consumption of each media item. If this data is available in addition to the timestamp of the start time of consumption, then the interval between the end of one media item and the start of the next can be calculated and used to determine the segmentation of sessions.

The media items recorded in the usage log 200 and in each session can be characterized in a number of ways. For example, usage logs and the media service may share a common identification scheme for the media items. Thus, the usage logs can just record the media item ID and cross reference with the media service database to obtain other metadata about the item or the item itself, as needed. In the context of the recommendation system, the media item can be characterized using a part of the metadata, depending on the type of recommendations that the media service is arranged to ultimately generate. For example, the usage log 200 can record the title of each media item (e.g. song title, book title etc.). Alternatively, the usage log 200 can record the author, artist, composer etc. of each media item. In a further alternative, the media items can be characterized by genre.

Figure 3:
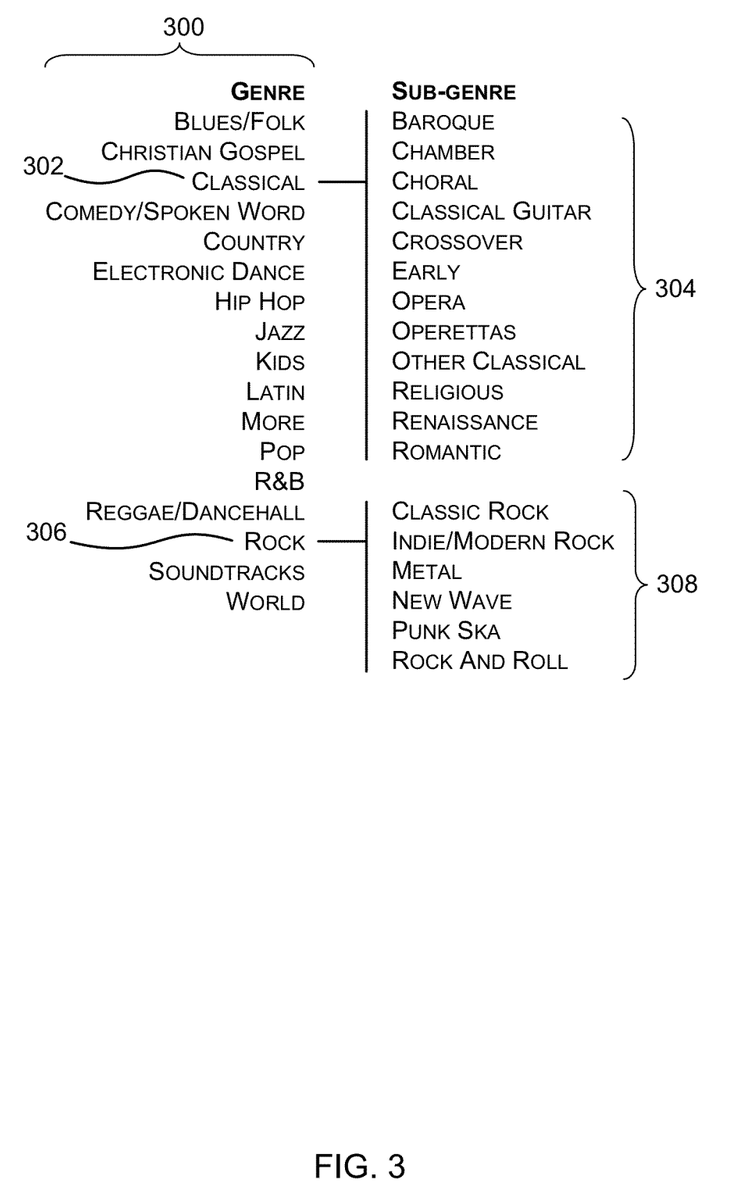
FIG. 3 illustrates an example music genre taxonomy.

An example genre taxonomy for music is illustrated in FIG. 3. The taxonomy in FIG. 3 is a two-level taxonomy showing seventeen top-level genres 300, and two example sub-genres. The genre of classical 302 has a sub-genre 304 comprising twelve more detailed classical genres, and the genre of rock 306 has a sub-genre 308 with six more detailed rock genres. More of the top-level genres 300 can also have sub-genres, but these are not shown for clarity.

As mentioned, the characterizing feature used for the media items depends on the desired outcome from the recommendation engine (described hereinafter). For example, if the titles are used, then the recommendation engine can recommend titles that it believes are relevant to the user. Alternatively, if authors/artists are used to identify the media items then the recommendation engine can recommend media items by certain authors/artists. In a further alternative, if the genre is used to characterize the consumed media items then the recommendation engine can recommend certain genres of media items to the user or media items that belong to recommended genres.

Therefore, if titles, authors or artists are used to characterize the consumed media items, then the recommendations can be more specific, but the computational complexity is higher due to the larger number of different media items. Conversely, if genre is used then the recommendations are less specific, but have a lower computational complexity. Note, however, that the recommendation engine can still be arranged to recommend certain titles of media items to the user even if only the genre is recorded, as the recommendation engine can determine a recommended genre and then select a title from within that genre for the user.

More generally, the training phase (when parameters of the model are inferred—as discussed below) and the recommendation phase are interdependent. If in the training phase the genre is used, then the derived model consequently recommends a genre in the recommendation phase.

Figure 4:
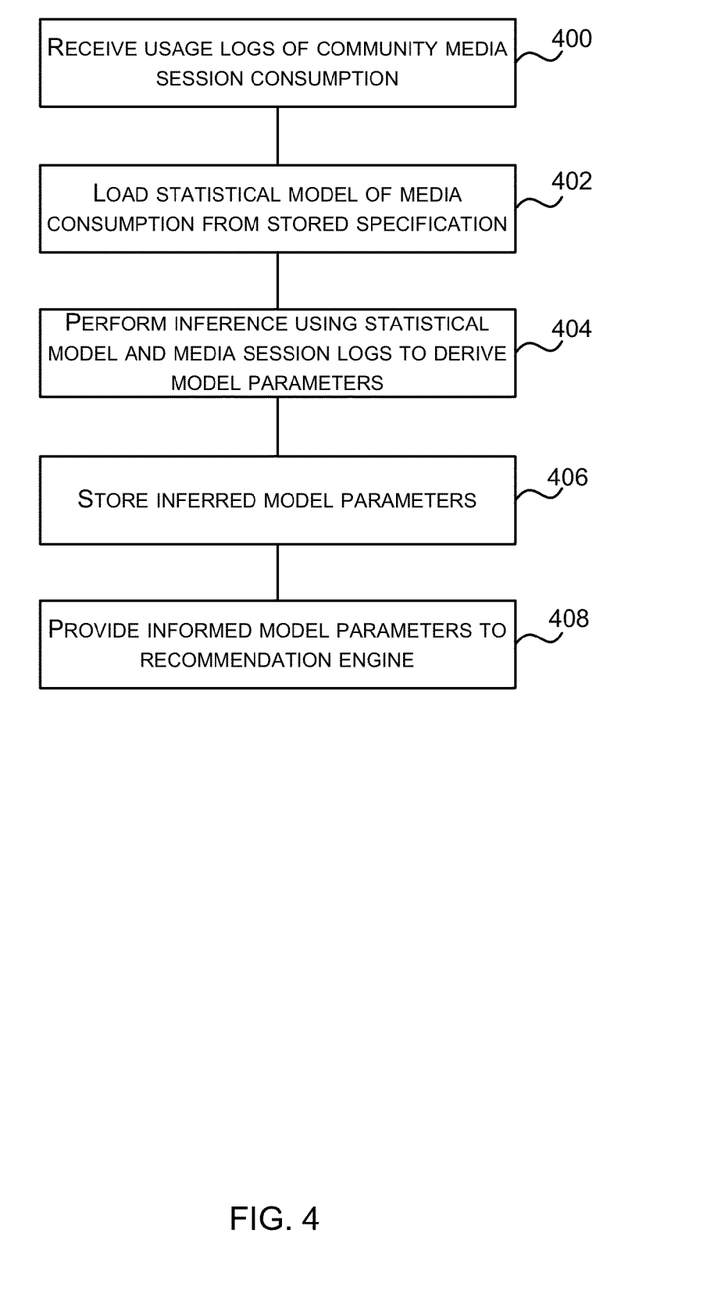
FIG. 4 illustrates a flowchart of a process for training a statistical model of media consumption.

Reference is now made to FIG. 4, which illustrates a flowchart of a process for training a statistical model of media consumption. The training of the statistical model is performed by the training engine 122 of FIG. 1. The statistical model trained by the process of FIG. 4 can be used by the recommendation engine 124, described hereinafter, to recommend media items to a user.

Firstly, the training engine 122 receives 400 the usage log 200 and segments this into per-user session form, as described above. In addition, the training engine loads or constructs 402 an untrained statistical model of media consumption from a stored specification, which can be stored at the training engine 122.

The statistical model expresses assumptions about the processes that generate the selection of media items. The statistical model comprises latent characteristics that are intended to capture aggregate factors that cannot be modeled explicitly, such as the "mood" of the user. By training the model the latent characteristics of both the community and individual users that influenced the media consumption within a usage session are quantified and learned. The statistical model is therefore a generative model.

The statistical model comprises a model for each user in the community 114. The model for each user is based on two probability distributions. A first probability distribution for each user defines a likelihood of the respective user having one of a plurality of latent characteristics in a given media session, and a second probability distribution for each latent characteristic defines a likelihood of a user selecting a media item given the latent characteristic.

Figure 5:
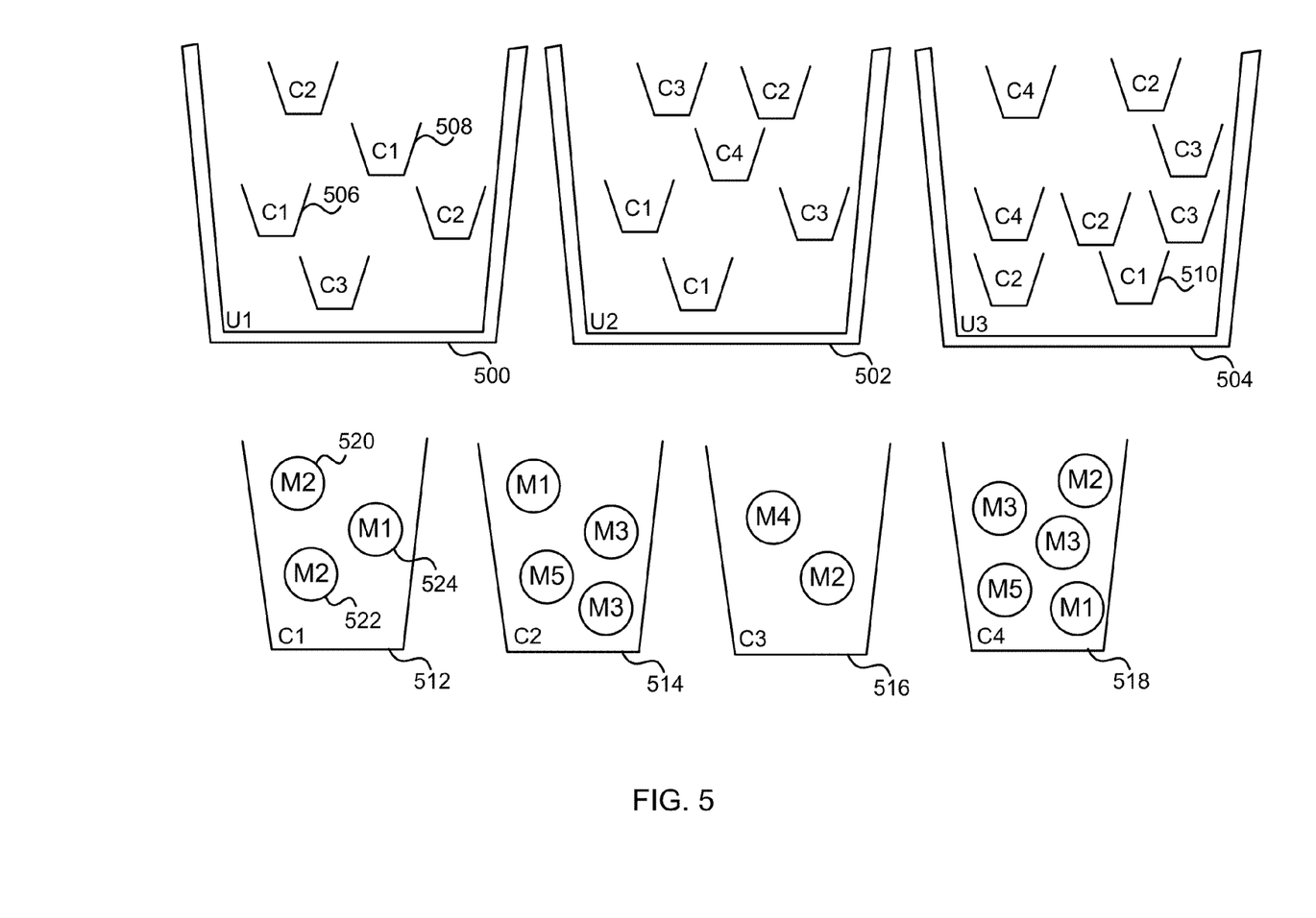
FIG. 5 illustrates a schematic illustration of the statistical model of media consumption.

FIG. 5 illustrates graphically how the statistical model works. Each user can be thought of as having a "bucket" with latent characteristics, e.g., listening preferences or moods that the user can assume during media listening. For example, a first user (u1, using the notation of FIG. 2) has a first user bucket 500, user u2 has a second user bucket 502 and user u3 has a third user bucket 504. The contents of the user buckets can be different for each user.

The statistical model assumes that for a given media session, the user selects a latent characteristic from its user bucket. The latent characteristic can be thought of as a latent, underlying mood of the user that guides the selection of media items for a given session. For example, user u1 selects one of latent characteristic c1, c2 or c3 from the first user bucket 500 for a session. However, some latent characteristics are more likely to be selected by a given user than others. For example, latent characteristic c1 appears twice (506 and 508) in the first user bucket 500, and is therefore twice as likely to be selected as latent characteristic c3 510 by user u1 for a session. There is therefore a probability distribution associated with the selection of a latent characteristic by a user for a session, and this is the first probability distribution mentioned above.

Each user has a different probability distribution for the selection of latent characteristics for a session, as shown by the different user bucket contents. Note that the same latent characteristics appear in user buckets of different users, such as c1 506 in the first user bucket 500 and c1 512 in the third user bucket 504.

Each latent characteristic in itself can also be considered to be a bucket containing media items. This is illustrated in FIG. 5 by a first characteristic bucket 512 for c1, a second characteristic bucket 514 for c2, a third characteristic bucket 516 for c3, and a fourth characteristic bucket 518 for c4. Each characteristic bucket comprises one or more media items (which can be identified by title, author, genre etc. as above). Media items can be present in more than one characteristic bucket.

Once a user has selected a latent characteristic for a given media session, then media items for consumption in that session are selected from the characteristic bucket. A probability distribution is associated with the media items in each characteristic bucket. For example, for the first characteristic bucket 512, media item m2 appears twice (520 and 522), and is therefore twice as likely to be selected as media item m1 524. The probability distribution associated with the media items in each characteristic bucket is the second probability distribution mentioned above.

It is to be noted that the selection of latent characteristic above is not a conscious selection by the user, but is instead a representation of an aggregate set of factors that influence user selections that cannot be modeled explicitly.

In general, the training engine uses the usage log data to determine the probability distributions of the statistical model. This comprises a community-aspect that uses the overall data from the community to determine the distribution of the media items within the latent characteristics (i.e., the contents of the characteristic buckets 512-518) and also a user-aspect to determine the distribution of the latent characteristics for a given session of the user (i.e. the contents of the user buckets 500-504).

The statistical model can be defined more formally as follows. Let $U=\{u_1, \ldots, u_n\}$ represent a set of users and $M=\{m_1, \ldots, m_q\}$ represent a set of media items that the users can consume. A media item can be a genre, an author/artist or title, as above. Each media consumption instance (u, m, t) represents user u listening to media item m at time t. A session $S=(m_1, \ldots, m_l)$ is a sequence of l media items that the user u has consumed, such that the interval between every two consecutive media items $m_i$ and $m_{i+1}$ is below a specified threshold $p_{threshold}$. The total set of media items consumed by a user, which can be referred to as a "playlist" $S_u$ includes a sequence of media sessions with sequences of media items that can be concatenated in a single list: $S_u=(S_1, \ldots, S_{t_u})=(m_1, \ldots, m_N)$.

Note that, for the same user, a media item can be repeated both in the same session, and across sessions.

It is also assumed that there are latent characteristics $C=\{c_1, \ldots, c_K\}$ which explain co-occurrence patterns of media items that users consume, and they provide (soft) clustering of the media items M. Thus, for each latent characteristic $c_k$, there is a probability distribution $\psi_k$ over the media items M. Also, the model assumes that each user u is represented as a distribution $\theta_u$ over different latent characteristics.

In one example, the statistical model assumes that $\psi_k$ for each latent characteristic $c_k$, is a random probability vector with a prior Dirichlet distribution $Dir(\beta)$, having parameter $\beta$, and $\theta_u$ for each user u is a random probability vector with a prior Dirichlet distribution $Dir(\alpha)$, having parameter $\alpha$.

The following process describes the generation of each user's playlist $S_u$:
1. For each latent media cluster, $c_k$:
   (a) Choose a distribution over media items from a prior Dirichlet distribution, $\psi_k \sim Dir(\beta)$
2. For each user, u:
   (a) Choose a distribution over latent characteristics from a prior Dirichlet distribution, $\theta_u \sim Dir(\alpha)$
   (b) For each session of the user, $S_i \in S_u$
      i. Choose a latent characteristic, $c_{ui}$, from the distribution over latent characteristics, given by $c_{ui} \sim Discrete(\theta_u)$
      ii. Choose each media item, $m_{uij}$, in the session from the latent characteristic's distribution over media items, given by $m_{uij} \sim Discrete(\psi_{c_{ui}})$ $Dir(\alpha)$ is an exchangeable Dirichlet prior, i.e., all pseudo-counts are identical and given by the parameter $\alpha$. $\theta_u \sim Dir(\alpha)$ is the parameter vector for a user-dependent Discrete distribution over latent characteristics. $Dir(\beta)$ is also an exchangeable Dirichlet prior and $\psi_k \sim Dir(\beta)$ is the parameter vector for a latent characteristic-dependent Discrete distribution over media items. The number of latent characteristics K is predefined, and can be selected to balance computational complexity against model accuracy.

According to this model, the joint probability distribution of the distributions $\psi$ over media items, the distributions $\theta$ over latent characteristics, the latent characteristic choice c for each user and session, and the media items m in user u's session, is:

$$p(m, c, \psi, \theta \mid \alpha, \beta) = \prod_{u=1}^{n} p(\theta_u \mid \alpha) \prod_{i=1}^{t_u} p(c_{ui} \mid \theta_u) \prod_{j=1}^{l_i} p(m_{uij} \mid \psi_{c_{ui}}) \prod_{k=1}^{K} p(\psi_k \mid \beta)$$

In one example, parameter $\beta$ is given the value 0.5, and parameter $\alpha$ is given the value 1.5/K, although in other examples alternative values for $\beta$ and $\alpha$ can be used.

Figure 6:
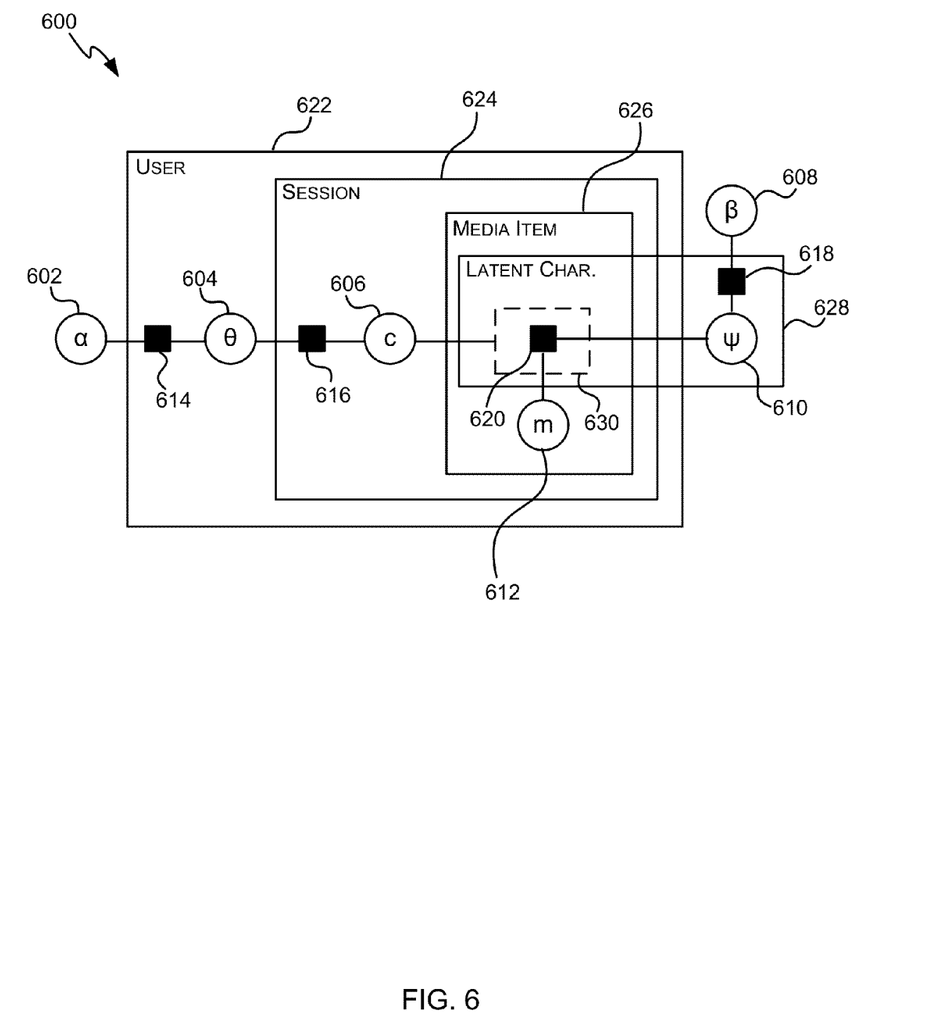
FIG. 6 illustrates a factor graph of the statistical model of media consumption.

The formal model above can be represented as a factor graph 600 as illustrated in FIG. 6. A factor graph is a way of representing probabilistic graphical models, such as the model for media selection used herein. Factor graphs comprise two types of nodes representing variables and factors, respectively. In the factor graph 600 of FIG. 6 variables 602, 604, 606, 608, 610 and 612 are represented as round nodes and factors 614, 616, 618 and 620 as square nodes. The variables 602, 604, 606, 608, 610 and 612 in the factor graph 600 are given the same notation as the formal model above. In a probabilistic model such as this, the factors refer to probabilistic distributions, deterministic functions, or constraints.

Graphically, the factor nodes connect only to variable nodes that are arguments of the factor. The factors are multiplied together to give an overall distribution function. In case of generative models such as this, the aim is to explain observed data and arrive at a dependency structure where latent and observed variables are generated from parent variables via a factor.

The factor graph of FIG. 6 utilizes additional notation that simplifies the visual representation. This includes plates, such as user plate 622, session plate 624, media item plate 626 and latent characteristic plate 628 which represent replicated parts of the model, and a gate 630 which is part of the model that is switched on or off depending on the value of a random variable. Plates are shown as rectangles with a solid boundary line, and the gate is shown as a dashed rectangle, with the gating variable attached to the rectangle rather than to the factor inside. The factors inside the gate are switched on or off by the value of the gating variable. The factor graph 600 representing the model can be used for inferring parameters of the model, as described below.

Referring again to FIG. 4, once the statistical model has been loaded, then inference can be performed 404 using the statistical model and the session information from the usage log 200. Inference is used to derive the parameters of the statistical model. In other words, the inference is used to determine the probability distributions of the model. More simplistically, referring again to FIG. 5, given the general structure of the user buckets containing characteristic buckets, which in turn contain media items, the inference is used to determine what the buckets actually contain for the media service in question. The statistical model is therefore trained to fit the usage log data.

Inferring the distributions of the statistical model is a Bayesian inference problem. Many different techniques can be used to perform Bayesian inference. In one example, Gibbs sampling can be used.

In a further example, message passing can be used with the factor graph 600 of FIG. 6 for approximate inference. Variational message passing (VMP) is one message passing algorithm that can be used with the factor graph 600. Message passing algorithms make use of a fully factorized approximation of the joint probability distribution; i.e. a factorization of each factor itself into univariate factors. For each factor in the graph, the algorithm calculates outgoing messages from the factor to each variable; each message is in the form of a univariate distribution over the target variable, and is calculated from the factor itself and all the incoming distribution messages via an update equation which minimizes a local divergence measure. The factorized approximation to the factor is given by the product of the outgoing messages.

These message-passing algorithms are fast and also have the benefit that calculations are local, so complex models can be pieced together with reusable building blocks. The Dirichlet and Discrete factors in the model above and factor graph 600 are two such building blocks, as are message update equations to deal with plates and gates.

As a result of performing the inference, the distributions u over media items, the distributions $\theta$ over latent characteristics are learnt. Specifically, the posterior marginal distributions of $\psi$ and $\theta$ are learnt. The inferred statistical model parameters are stored 406. These inferred statistical model parameters can then be provided 408 to the recommendation engine 124, for subsequent use.

The process of FIG. 4 can be performed periodically, such that as the usage log 200 is updated with more data, the process of FIG. 4 can be run to update the learnt parameters of the statistical model. This ensures that the parameters of the statistical model reflect current user behavior. However, the process of FIG. 4 does not need to provide results in real-time, and hence can operate as background process. This is in contrast to the recommendation engine 124, described hereinafter, which provides real-time results to a user.

It is to be noted that the training of the statistical model, i.e., inferring the model parameters, makes use both of community-wide data and individual user data. The determination of the probability distribution $\psi$ over the media items for each latent characteristic is learnt using the information from all users in the community. This gives a large amount of data to accurately determine these distributions. Conversely, the distributions $\theta$ over different latent characteristics is learnt from individual user data.

Figure 7:
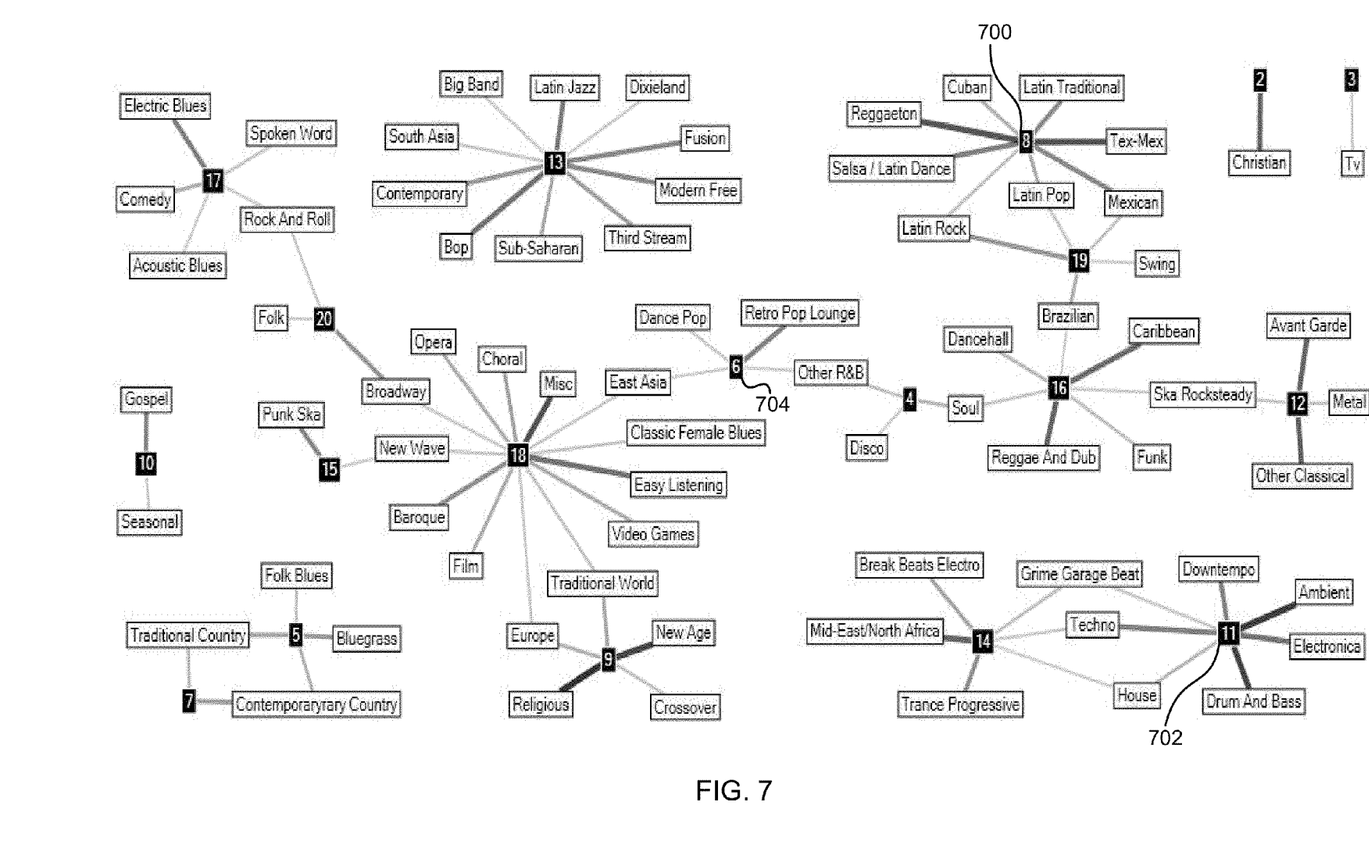
FIG. 7 illustrates example latent characteristics for music genres.

Example results of the determination of the probability distribution $\psi$ over the media items for each latent characteristic are illustrated in FIG. 7. FIG. 7 shows an example for a music service, where the media items are identified by genre (for example as illustrated in FIG. 3). FIG. 7 shows how genres are associated with latent characteristics (identified by numbers in square black boxes) produced by the above-described statistical model. In this example, a genre is connected to a latent characteristic if the normalized Dirichlet posterior of a genre in the latent characteristic is more than 0.25. This is done to simplify the diagram for clarity. The thickness of the line connecting a genre to a latent characteristic reflects the strength of the genre affiliation with the latent characteristic. In other words, the thickness of the line indicates the likelihood of a genre belonging to a latent characteristic in the probability distribution u (in other words the likelihood of a genre being in a given characteristic bucket in FIG. 5).

It can be observed that some latent characteristics comprise clusters of genres resembling the groupings of genre in the taxonomy shown in FIG. 3. For example, latent characteristic 8 (labeled 700) and 11 (labeled 702) have similar genre grouping as the high-level genre categories Latin and Electronic/Dance, respectively. On the other hand, latent characteristic 6 (labeled 704) comprises a mixture of high-level genres: Electronic/Dance, R&B, Pop and World. This illustrates how the latent characteristics, which are derived from the community as a whole, capture more than just genres and similarities between genres, and are an aggregate of many underlying factors.

Figure 8:
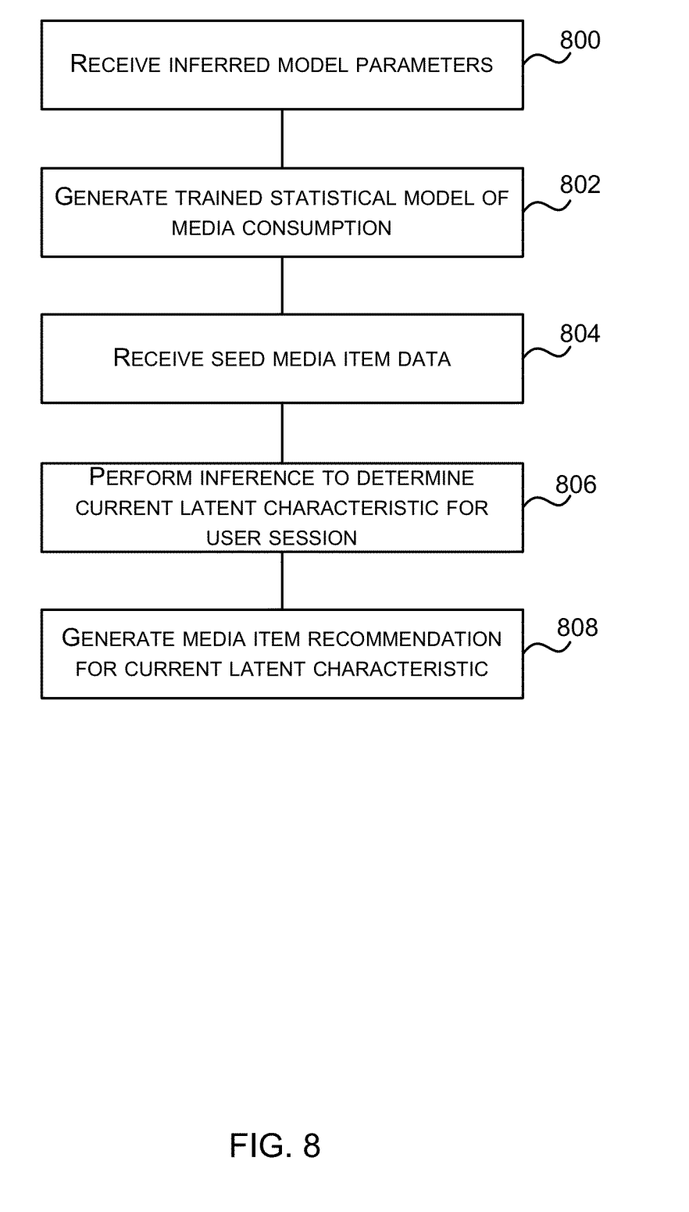
FIG. 8 illustrates a flowchart of a process for recommending media using a statistical model of media consumption.

Reference is now made to FIG. 8, which illustrates a flowchart of a process for recommending media to a selected user using the trained statistical model of media consumption. The process of FIG. 8 can be implemented in the recommendation engine 124 shown in FIG. 1. In the following explanation, the recommendation engine 124 is recommending media items to the first user 102 in FIG. 1. The recommendation process can be considered to be a collaborative filtering process.

The recommendation engine 124 receives 800 the inferred parameters of the statistical model, as generated by the training engine 122 as described above. Note that the inferred parameters do not need to be generated on-demand for the recommendation engine, but can be the most recently updated parameters. The recommendation engine 124 then retrieves the statistical model (if not provided by the training engine) from a memory or constructs the statistical model from a stored specification, and applies the inferred parameters to the statistical model to generate 802 a trained statistical model. In an alternative example, the trained statistical model (i.e. already comprising the inferred parameters) can be provided from the training engine.

Information regarding one or more "seed" media items consumed by the first user 102 is received 804 at the recommendation engine 124. Seed media items are media items that have either been consumed during a current session of the first user 102, or were consumed during a previous session. For example, if the recommendation engine 124 is to recommend media items to the first user 102 to consume during an ongoing session, then the recommendation engine 124 can receive information on the media items that the user has selected for the session so far, and then use these to infer recommended media items for future consumption during this session. In one example, the recommendation engine 124 receives information on between five and ten media items that the first user 102 has selected during the current session.

Once the seed media items have been received, the recommendation engine can use the trained statistical model and the seed media items to infer 806 a current latent characteristic for the first user 102. In other words, the recommendation engine 124 determines, given the seed media items, what the most likely current latent characteristic is for this session. This can be achieved because the training of the statistical model has determined the probability distributions of the latent characteristics for the first user 102, and also the probability distributions of the media items for the latent characteristics.

When the current latent characteristic for this session has been determined, one or more media items can be generated 808 as recommendations for the current session. The recommended media items can be generated by randomly generating media items using the probability distribution for the current latent characteristic. As mentioned above, the type of recommendation depends on the type of data used to train the model, e.g. recommending a genre, author/artist, or title.

When one or more media items have been recommended for a user, the recommendations can be used in different ways. In one example, the recommendations can be used to generate a play-list of media items that is provided to the user a list of recommendations. Alternatively, the recommendations can be used to control a media-streaming service, such that the next media item streamed to the user is one of the recommendations. In a further alternative, the recommendations can be used to target suggestions or advertising of media items to the user.

In an example scenario, the recommendation system can be used in the form of an automated DJ, where a group of users can be collocated (e.g., in a disco). Individual users can select a song thus creating a collective experience. The recommendation system can continue to recommend songs for users to select from, based on the songs that have been selected already during the current disco. In this scenario, the selection is done per location (e.g., disco) and there are multiple selection devices for a single consumer (in this case the disco/automated DJ).

Figure 9:
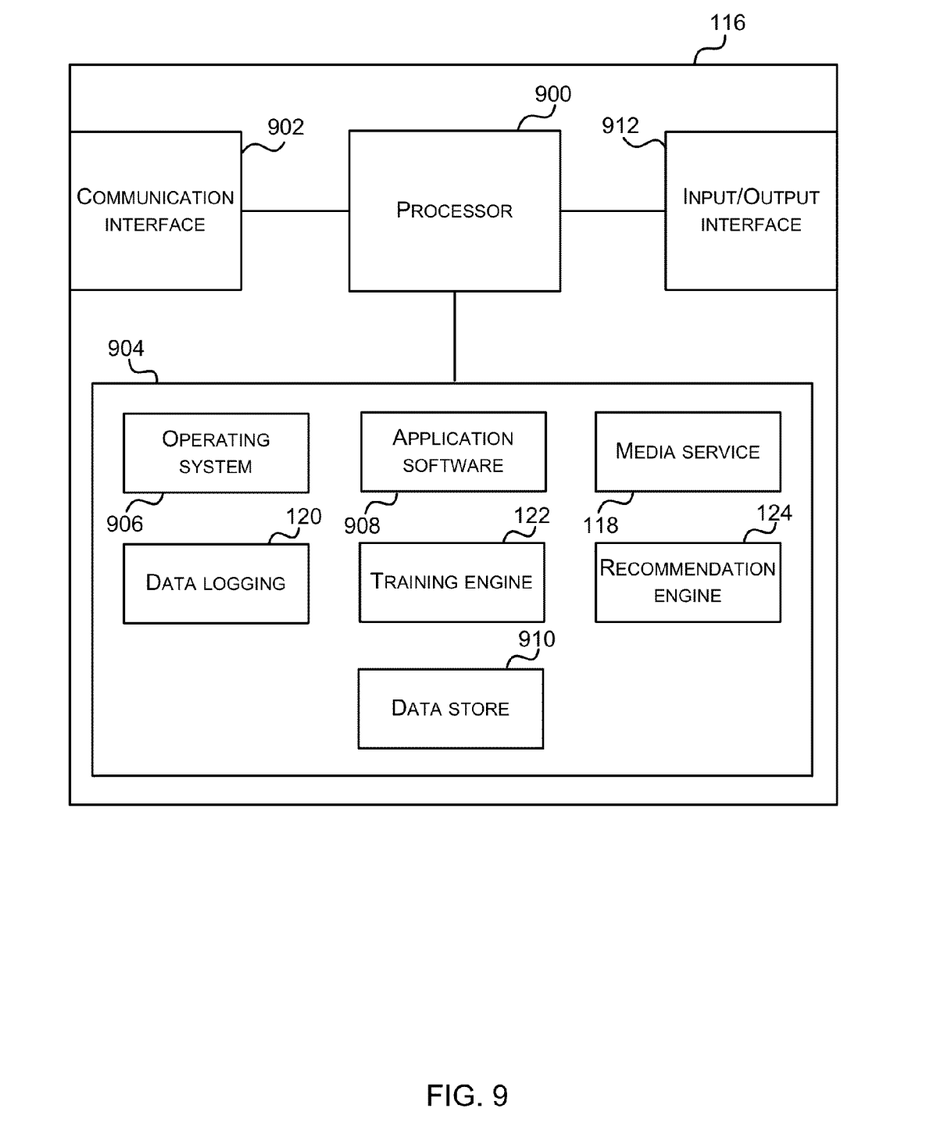
FIG. 9 illustrates an exemplary computing-based device in which embodiments of the media recommendation technique may be implemented.

Reference is now made to FIG. 9, which illustrates various components of an exemplary computing-based device 116 which may be implemented as any form of a computing and/or electronic device, and in which the functionality of the server of FIG. 1 can be implemented.

Computing-based device 116 comprises one or more processors 900 which may be microprocessors, controllers or any other suitable type of processor for processing computing executable instructions to control the operation of the device in order to implement the training and media recommendation techniques.

The computing-based device 116 also comprises a communication interface 902, which can be arranged to communicate with one or more communication networks. For example, the communication interface 902 can connect the computing-based device 116 to network 126 (e.g. the internet). The computing-based device 116 can communicate with the user terminals of the community 114 using the communication interface 902 to send and receive messages and data. The communication interface 902 can also enable the computing-based device 116 to communicate with the storage device 128 to store and retrieve usage log data. Alternatively, the storage device 128 can be integral with the computing-based device 116.

Computer-executable instructions and data storage can be provided using any computer-readable media that is accessible by computing-based device 116. Computer-readable media may include, for example, computer storage media such as memory 904 and communications media. Computer storage media, such as memory 904, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (such as memory 904) is shown within the computing-based device 116 it will be appreciated that the storage may be distributed or located remotely and accessed via a network or other communication link (e.g. using communication interface 902).

Platform software comprising an operating system 906 or any other suitable platform software may be provided at the memory 904 of the computing-based device 116 to enable application software 908 to be executed on the device. The memory 904 can store executable instructions to implement the functionality of the media service 118, data logging 120, training engine 122 and recommendation engine 124, as described above, when executed on the processor 900. The memory 904 can also provide a data store 910, which can be used to provide storage for the statistical model, the inferred model parameters, segmented session data, media recommendations, and any other data.

The computing-based device 116 can optionally also comprise an input/output controller 912 arranged to output display information to a display device which may be separate from or integral to the computing-based device 116. The display information may provide a graphical user interface. The input/output controller 912 can also be arranged to receive and process input from one or more devices, such as a user input device (e.g. a mouse or a keyboard). In an example the display device may also act as the user input device if it is a touch sensitive display device. The input/output controller 912 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal media players, personal digital assistants and many other devices.

The methods described herein may be performed by software in machine readable form on a tangible storage medium. Examples of tangible (or non-transitory) storage media include disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of recommending one or more media items, comprising:
   receiving a data set comprising data describing media session consumption for a plurality of users, each media session comprising at least one media item;
   loading a statistical model of media consumption, the statistical model comprising: a first probability distribution for each user of the plurality of users defining a likelihood of a respective user having one of a plurality of latent characteristics for a given media session, wherein each latent characteristic of the plurality of latent characteristics is associated with an affinity of the plurality of users for consuming related media within a substantially short period of time; and a second probability distribution for each latent characteristic of the plurality of latent characteristics defining a likelihood of one or more of the plurality of users selecting a particular media item based on a respective latent characteristic;
   applying the data set to the statistical model to infer parameters of the first and second probability distributions; and
   providing the parameters to a recommendation engine configured to use the statistical model and the inferred parameters to recommend one or more media items to a selected user,
   the one of a plurality of latent characteristics relating to an underlying mood of the respective user during a given media session and the underlying mood being associated with the affinity of the plurality of users for consuming related media within a threshold time interval.

2. A method according to claim 1, wherein each media session of the data set is associated with a threshold time interval within which a user consumes consecutive media items, and
   wherein the threshold time interval indicates a relatedness of consecutive media items.

3. A method according to claim 1, wherein the first probability distribution is based on a Dirichlet distribution.

4. A method according to claim 1, wherein the second probability distribution is based on a Dirichlet distribution.

5. A method according to claim 1, wherein the step of applying the data set to the statistical model to infer parameters of the first and second probability distributions further comprises performing a Bayesian inference on the statistical model using the data set.

6. A method according to claim 5, wherein the step of performing Bayesian inference on the statistical model further comprises constructing a factor graph of the statistical model and executing a variational message passing algorithm on the factor graph.

7. A method according to claim 1, wherein the statistical model is a generative probabilistic model.

8. A method according to claim 1, wherein a number of latent characteristics in the statistical model is a predefined parameter.

9. A method according to claim 1, wherein the particular media item is identified by at least one of: a genre; an author; and a title.

10. A method according to claim 1, wherein each media session comprises one or more media items associated with at least one of:
    songs; books; photographs; videos; films; news stories; blog and microblog postings; and social networking updates.

11. A method according to claim 1, wherein each of the plurality of users is a user of an online social network or media environment, and
    wherein the data set is provided by the online social network or media environment.

12. A computing-based device for recommending media items to a user, comprising:
    a memory configured to store a statistical model of media consumption, the statistical model comprising: a first probability distribution for the user defining a likelihood of the user having one of a plurality of latent characteristics for a given media session, wherein each latent characteristic of the plurality of latent characteristics is associated with an affinity for consuming related media within a distinct period of time; and a second probability distribution for each latent characteristic of the plurality of latent characteristics defining a likelihood of the user selecting a particular media item based on a respective latent characteristic, the one of the plurality of latent characteristics relating to an underlying mood of the respective user during a given media session and the underlying mood being associated with the affinity of the plurality of users for consuming related media within a threshold time interval;

a communication interface configured to receive data describing one or more media items previously consumed by the user; and one or more processors configured to use the statistical model and the received data describing one or more media items previously consumed by the user to infer a current latent characteristic for a current media session of the user, and recommend one or more media items for future consumption by the user based on the inferred current latent characteristic.

13. A computing-based device according to claim 12, wherein the first and second probability distributions further comprise parameters provided by a training engine and inferred from media session consumption data of a plurality of users.

14. A computing-based device according to claim 12, wherein the one or more processors is configured to generate one or more recommended media items by selecting media items using the second probability distribution for the current latent characteristic.

15. A computing-based device according to claim 12, wherein the one or more media items previously consumed by the user are consumed by the user in the current media session.

16. A computing-based device according to claim 12, wherein the one or more media items previously consumed by the user a consumed in a previous media session to the current media session.

17. A computing-based device according to claim 12, wherein the one or more processors is further configured to use the recommended one or more media items to generate a play-list comprising a plurality of recommended media items.

18. A computing-based device according to claim 12, wherein the one or more processors is further configured to control a streaming of the one or more recommended media items to the user.

19. A computer-implemented method of generating a music play-list for a selected user, comprising:

receiving a data set comprising data describing music-listening sessions for a plurality of users of a social music service, each music-listening session comprising a plurality of user-selected songs;

storing, at a memory, a generative statistical model of music selection of the social music service, the generative statistical model comprising: a first probability distribution for each user of the social music service defining a likelihood of a respective user having one of a plurality of latent moods for a given music-listening session, wherein each latent mood of the plurality of latent moods is associated with an affinity of the plurality of users for listening to related music within a pre-defined period of time; and a second probability distribution for each latent mood of the plurality of latent moods defining a likelihood of one or more of the plurality of users selecting a particular song based on a respective latent mood, the one of a plurality of latent moods relating to an underlying mood of the respective user during a given media session and the underlying mood being associated with the affinity of the plurality of users for consuming related media within a threshold time interval;

performing a Bayesian inference, with one or more processors, on the generative statistical model using the data set to infer parameters of the first and second probability distributions and generate a trained statistical model;

receiving data describing one or more songs previously listened to by the selected user;

using the trained statistical model and the received data describing one or more songs previously listened to by the selected user to infer a current latent mood associated with a current music-listening session of the selected user; and generating a music play-list for the selected user comprising recommended songs associated with the current latent mood of the current music-listening session.

* * * * *